(12) United States Patent
Chaumonnot et al.

(10) Patent No.: US 8,226,740 B2
(45) Date of Patent: *Jul. 24, 2012

(54) INORGANIC MATERIAL THAT HAS METAL NANOPARTICLES THAT ARE TRAPPED IN A MESOSTRUCTURED MATRIX

(75) Inventors: Alexandra Chaumonnot, Lyons (FR); Aurelie Coupe, Noisiel (FR); Clement Sanchez, Gif-sur-Yvette (FR); Cedric Boissiere, Paris (FR); David Grosso, Rueil Malmaison (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 216 days.

This patent is subject to a terminal disclaimer.

(21) Appl. No.: 11/889,890

(22) Filed: Aug. 17, 2007

(65) Prior Publication Data

US 2008/0072705 A1  Mar. 27, 2008

Related U.S. Application Data

(63) Continuation of application No. PCT/FR2006/001111, filed on May 17, 2006.

(30) Foreign Application Priority Data

Jun. 2, 2005 (FR) .................................. 05/05.676

(51) Int. Cl.
  *B01J 21/06* (2006.01)
  *B01J 23/74* (2006.01)
  *B01J 23/76* (2006.01)
  *B01J 29/68* (2006.01)

(52) U.S. Cl. ............... 75/252; 75/370; 502/64; 502/66; 502/71; 502/258; 502/260; 502/263; 502/344; 977/777; 977/779

(58) Field of Classification Search .................. None
See application file for complete search history.

(56) References Cited

U.S. PATENT DOCUMENTS 6,592,764 B1 * 7/2003 Stucky et al. ............. 210/660
6,669,924 B1 * 12/2003 Kaliaguine et al. ......... 423/702
7,807,598 B2 * 10/2010 Euzen et al. ................ 502/71
2004/0144318 A1 * 7/2004 Beck et al. .............. 118/723 R
2006/0030477 A1   2/2006 Chaumonnot et al.

FOREIGN PATENT DOCUMENTS

EP       1627853       2/2006
WO  WO 2006/128988  12/2006

OTHER PUBLICATIONS

Prokesova, P. et al., "Preparation of nanosized micro/mesoporous composites via simultaneous synthesis of Beta/MCM-48 phases", Mesoporous and Microporous Materials, vol. 64, pp. 165-174, 2003.*
Grosso, D. et al., "Periodically ordered nanoscale islands and mesoporous films composed of nanocrystalline multimetallic oxides", Nature Materials, vol. 3, Nov. 2004, pp. 787-792.*
Schneeweiss, O. et al., Novel solid-state synthesis of alpha-Fe and Fe3O4 nanoparticles embedded in a MgO matrix, Nanotechnology, vol. 17, 2006, pp. 607-616.*
Maas, H. et al., "Encapsulated Lanthanides as Luminescent Materials", Angew.Chem.IntEd., vol. 41, No. 14, 2002, pp. 2495-2497.*
Dolores Perez, M. et al., "Growth of Gold Nanoparticle Arrays in TiO2 Mesoporous Matrixes", Langmuir 2004, vol. 20, pp. 6879-6886, published Jul. 9, 2004.*
World IP Organization. "International Search Report and Written Opinion" corresponding to PCT/FR2009/000208, mailed Oct. 6, 2009.

* cited by examiner

*Primary Examiner* — George Wyszomierski
(74) *Attorney, Agent, or Firm* — Millen, White, Zelano & Branigan, P.C.

(57) ABSTRACT

An inorganic material that consists of at least two elementary spherical particles, each of said spherical particles comprising metal nanoparticles that are between 1 and 300 nm in size and a mesostructured matrix with an oxide base of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium is described, whereby said matrix has a pore size of between 1.5 and 30 nm and has amorphous walls with a thickness of between 1 and 30 nm, said elementary spherical particles having a maximum diameter of 10 μm. Said material can also contain zeolitic nanocrystals that are trapped within said mesostructured matrix.

50 Claims, 3 Drawing Sheets

INORGANIC MATERIAL THAT HAS METAL NANOPARTICLES THAT ARE TRAPPED IN A MESOSTRUCTURED MATRIX

This application is a continuation of International Application PCT/FR06/01111 filed May 17, 2006, which claims benefit of priority from French Application 05/05.676 filed Jun. 2, 2005.

This invention relates to the field of inorganic oxide materials, in particular to those containing transition metals and/or rare earths, having an organized and uniform porosity in the field of mesoporosity. It also relates to the preparation of these materials that are obtained by the use of the so-called "aerosol" synthesis technique.

PRIOR ART

The new strategies of synthesis that make it possible to obtain materials with a well-defined porosity in a very wide range, going from microporous materials to macroporous materials by passing through materials with hierarchized porosity, i.e., having pores of several sizes, have been undergoing a very extensive development within the scientific community since the mid-1990's (G. J. of A. A. Soler-Illia, C. Sanchez, B. Lebeau, J. Patarin, *Chem. Rev.*, 2002, 102, 4093). Materials whose pore size is controlled are obtained. In particular, the development of so-called "fine chemistry" synthesis methods led to the development of low-temperature mesostructured materials by the coexistence in aqueous solution or in polar solvents of inorganic precursors with structuring agents, generally molecular or supramolecular, ionic or neutral surfactants. The monitoring of the electrostatic interactions or by hydrogen bonds between the inorganic precursors and the structuring agent jointly linked to hydrolysis/condensation reactions of the inorganic precursor leads to a cooperative assembly of organic and inorganic phases that generate micellar aggregates of surfactants of uniform size that are monitored within an inorganic matrix. This cooperative self-assembly phenomenon, controlled, i.a., by the concentration of structuring agent, can be induced by gradual evaporation of a reagent solution whose structuring agent concentration is most often less than the critical micellar concentration, which leads either to the formation of mesostructured films in the case of a deposit on a substrate (technique of layer deposition by immersion or "dip-coating") or to the formation of a mesostructured powder after the solution is sprayed (aerosol technique). By way of example, the U.S. Pat. No. 6,387,453 discloses the formation of mesostructured organic-inorganic hybrid films by the technique of layer deposition by immersion ("dip-coating"), whereby these same authors have furthermore used the aerosol technique for developing mesostructured, purely silicic materials (C. J. Brinker, Y. Lu, A. Sellinger, H. Fan, *Adv. Mater.*, 1999, 11, 7). The release of the porosity is then obtained by elimination of the surfactant, the latter conventionally being carried out by chemical extraction processes or by heat treatment. Based on the nature of the inorganic precursors and the structuring agent that is used as well as operating conditions that are imposed, several families of mesostructured materials have been developed. For example, the M41S family initially developed by Mobil (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, *J. Am. Chem. Soc.*, 1992, 114, 27, 10834), consisting of mesoporous materials that are obtained via the use of ionic surfactants such as quaternary ammonium salts, having a generally hexagonal, cubic or lamellar structure, pores of a uniform size in a range of 1.5 to 10 nm, and amorphous walls with a thickness on the order of 1 to 2 nm, has been studied extensively. Subsequently, structuring agents of different chemical nature have been used such as block-copolymer-type amphiphilic macromolecules, whereby the latter lead to mesostructured materials that have a generally hexagonal, cubic or lamellar structure, pores of uniform size in a range of 4 to 50 nm, and amorphous walls with a thickness in a range of 3 to 7 nm.

In addition to techniques of synthesis by layer deposition by immersion ("dip-coating") or "aerosol" described above that use the phenomenon of gradual concentration of the inorganic precursors and of the structuring agent within the solution where they are present, the mesostructured materials can be obtained by direct precipitation within an aqueous solution or in solvents of marked polarity by manipulating the value of the critical micellar concentration of the structuring agent. In general, the synthesis of these materials obtained by precipitation requires an ageing stage in an autoclave, and all of the reagents are not integrated in products in a stoichiometric amount since they can be found in the supernatant. Based on the structure and the degree of organization desired for the final mesostructured material, these syntheses can take place in an acid medium (pH≦1) (WO 99/37705) or in a neutral medium (WO 96/39357), whereby the nature of the structuring agent that is used also plays a predominant role. The elementary particles that are thus obtained do not have a uniform shape and are generally characterized by a size of greater than 500 nm.

The discovery of these materials with uniform and organized porosity opened up new perspectives relative to the development of innovative solids for potential applications in fields as varied as catalysis, the separation of chemical molecules, but also optics, electronics, and biochemistry. In particular, the study of the introduction of metal nanoparticles within the essentially silicic oxide mesostructured matrices was the object of a large number of publications and patents. Actually, the use of such a host network during the synthesis of metal nanoparticles contributed to the following scientific advances: a better monitoring of the size and the morphology of the metal nanoparticles leading, for example within the field of catalysis, to new activities and selectivities based on studied reactions as well as a better dispersion of the metal nanoparticles within the substrate thanks to an enhanced diffusion of metal precursors on the part of the organization of the porosity of the host network. One of the standard processes that makes possible the incorporation of the metal nanoparticles within a mesostructured silica network consists in synthesizing, during a first stage, the host network according to the synthesis methods described above, then, during a second stage, in forming, inside of the thus created porosity, metal nanoparticles according to the following non-exhaustive methods: impregnation of precursor inorganic salts, metal ion exchanges with ions that are present on the surface of the host network, grafting of organometallic complexes, of metal crystallites (also called "clusters"), or of pre-formed nanoparticles stabilized by organic ligands, etc. This process thus makes possible the development of mesostructured, essentially silicic solids that have, within their porosity, nanoparticles of gold, noble metals, iron oxide, silver oxide, etc. (A. Fukuoka, H. Araki, Y. Sakamoto, S. Inagaki, Y. Fukushima, M. Ichikawa, *Inorganica Chimica Acta*, 2003, 350, 371: S. Behrens, G. Spittel, Dalton Trans. 2005, 868: K.-J. Chao, M.-H. Cheng, Y.-F. Ho, P.-H. Liu, *Catalysis Today*, 2004, 97, 49; M. Fröba, R. Köhn, G. Bouffaud, *Chem. Mater.*, 1999, 11, 2858). Another option consists in introducing the desired nanoparticles directly during the development of the mesostructured host network. It is thus possible to introduce, within micelles formed by the structuring agent during synthesis, precursors of metal nanoparticles by manipulating their hydrophobic or electrostatic properties (G. Lü, D. Ji, G. Qian, Y. Qi, X. Wang, J. Suo, *Applied Catalysis A: General*, 2005, 280, 175; Ö Dag, O. Samarskaya, N. Coombs, G. A. Ozin, *J. Mater. Chem.*, 2003, 13, 328). The overall structure of these processes, however, leads to a partial, and even total, obstruction of the porosity of the mesostructured matrix, which ultimately does not permit simultaneously benefiting from textural and/or structural properties of the mesostructuring and metal nanoparticles.

SUMMARY OF THE INVENTION

The invention relates to a material that consists of at least two elementary spherical particles, each of said spherical particles comprising metal nanoparticles of a size of between 1 and 300 nm, and a mesostructured matrix with an oxide base of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of aluminum, titanium, zirconium, gallium, germanium and cerium, whereby said mesostructured matrix has a pore size of between 1.5 and 30 nm and has amorphous walls with a thickness of between 1 and 30 nm, whereby said elementary spherical particles have a maximum diameter of 10 μm. Metal nanoparticles are defined as particles of nanometric size comprising at least one metal belonging to the family of transition metals (columns 3 to 12 of the periodic table according to the classification of IUPAC) and/or to the family of rare earth metals (lanthanides and actinides). Said mesostructured matrix with an oxide base of at least one element X that is selected from the list that is described above advantageously contains an element X' that is selected from the group that consists of silicon, aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of silicon, aluminum, titanium, zirconium, gallium, germanium, and cerium, whereby the elements X and X' are different. The material according to the invention can also contain, in addition to the metal nanoparticles, zeolitic nanocrystals that are trapped in the oxide mesostructured matrix, whereby said zeolitic nanocrystals have a pore size of between 0.2 and 2 nm. This invention also relates to the preparation of the material according to the invention. Said process comprises a) the synthesis of metal particles of a maximum nanometric size that is equal to 300 nm so as to obtain a stable colloidal solution in which said nanoparticles are dispersed; b) the mixing in solution of at least one surfactant, at least one precursor of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of aluminum, titanium, zirconium, gallium, germanium and cerium, of at least one stable colloidal solution of metal nanoparticles obtained according to a), optionally at least one precursor of at least one element X' that is selected from the group that consists of silicon, aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of silicon, aluminum, titanium, zirconium, gallium, germanium and cerium, whereby the elements X and X' are different, and optionally at least one stable colloidal solution in which crystals of zeolites of a maximum nanometric size that is equal to 300 nm are dispersed; c) the aerosol spraying of said solution that is obtained in stage b) to lead to the formation of spherical droplets with a diameter of less than 200 μm; d) the drying of said droplets, and e) the elimination of at least said surfactant for obtaining a mesostructured material in which metal nanoparticles are trapped.

The ordered structure of the matrix of the material according to the invention is consecutive to the phenomenon of micellization or self-assembly by evaporation induced by the so-called aerosol technique.

ADVANTAGE OF THE INVENTION

The material according to the invention that consists of spherical particles comprising metal nanoparticles that are trapped in a mesostructured matrix, with amorphous walls and with an oxide base of at least said element X, whereby said matrix optionally comprises at least one element X' that is selected from the group that consists of silicon, aluminum, titanium, tungsten, zirconium, gallium, germanium, tin, antimony, lead, vanadium, iron, manganese, hafnium, niobium, tantalum, yttrium, cerium, gadolinium, europium and neodymium (whereby X' is different from X), simultaneously has the structural, hydro-dehydrogenating and oxidation-reduction properties that are specific to the metal particles and the structural, textural and optionally acido-basicity and oxidation-reduction properties that are specific to the materials with an oxide base of at least said element X and optionally specific to the oxide materials with a base of said element X' in addition to said element X. The development on the nanometer scale of a composite oxide material that is formed by a mesostructured matrix and metal nanoparticles leads to a preferred connection of metal nanoparticles and the uniform and organized mesoporosity of the oxide matrix within the same spherical particle. In addition, whereby the material according to the invention consists of spherical elementary particles, the diameter of these particles varies advantageously from 50 nm to 10 μm and preferably from 50 to 300 nm; the limited size of these particles as well as their homogeneous form makes it possible to have a better diffusion of the reagents and the products of the reaction during the use of the material according to the invention in potential industrial applications compared to materials that are known from the prior art that come in the form of elementary particles of non-homogeneous shape, i.e., irregular, and of a size of much larger than 500 nm.

In contrast, the process for the preparation of the material according to the invention that consists in making at least one surfactant, ionic or non-ionic, interact, preferably in an acid medium, with at least one precursor of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium, and neodymium, preferably selected from the group that consists of aluminum, titanium, zirconium, gallium, germanium and cerium, at least one colloidal solution in which metal particles of a maximum nanometric size that is equal to 300 nm are dispersed, optionally at least one precursor of at least one element X' that is selected from the group that consists of silicon, aluminum, titanium, tungsten, zirconium, gallium, germanium, tin, antimony, lead, vanadium, iron, manganese, hafnium, niobium, tantalum, yttrium, cerium, gadolinium, europium, and neodymium, preferably selected from the group that consists of silicon, aluminum, titanium, zirconium, gallium, germanium and cerium (X' being different from X) and optionally at least one colloidal solution in which zeolite crystals of a maximum nanometric size that is equal to 300 nm are dispersed, whereby the ordered structure of the material is consecutive to the phenomenon of micellization or self-assembly by evaporation induced by the so-called aerosol technique, makes it possible to develop in an easy manner mesostructured composite/metal nanoparticle materials that optionally comprise zeolite nanocrystals and to work with a wide range of metal nanoparticles and optionally zeolite nanocrystals regardless of their initial synthesis processes since said particles, optionally said crystals, have the property of dispersing in solution, in particular in acidic solution and very preferably in acidic aqueous organic solution, in the form of particles, optionally in the form of zeolite crystals with a maximum nanometric size that is equal to 300 nm.

Furthermore, the optional trapping of zeolite nanocrystals in the oxide mesostructured matrix in addition to that of the metal nanoparticles makes it possible to develop, via a "one pot" synthesis method, materials that simultaneously have an acid function and a hydro-dehydrogenating function having preferred connections by the size and the morphology of elementary spherical particles and the mesostructuring of the oxide matrix.

In addition, relative to the known syntheses of the mesostructured materials, the preparation of the material according to the invention is carried out continuously, the period of preparation is reduced (several hours as opposed to 12 to 24 hours by using autoclaving), and the stoichiometry of the non-volatile radicals that are present in the initial solution of the reagents is kept in the material in the invention.

SPECIFICATION OF THE INVENTION

The object of this invention is an inorganic material that consists of at least two elementary spherical particles, each of said spherical particles comprising metal nanoparticles of a size of between 1 and 300 nm and a mesostructured matrix with an oxide base of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, whereby said mesostructured matrix has a pore size of between 1.5 and 30 nm and has amorphous walls with a thickness of between 1 and 30 nm, whereby said elementary spherical particles have a maximum diameter of 10 µm.

According to the invention, the element X that is present in oxide form in the mesostructured matrix in each of said spherical particles of the material according to the invention is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, and preferably said element X that is present in oxide form is selected from the group that consists of aluminum, titanium, zirconium, gallium, germanium and cerium. Said matrix with an oxide base of at least said element X is mesostructured: it has mesopores that have a uniform size of between 1.5 and 30 nm and preferably between 1.5 and 10 nm, distributed homogeneously and uniformly in each of said particles. The material that is located between the mesopores of the mesostructured matrix is amorphous and forms walls whose thickness is between 1 and 30 nm. The thickness of the walls corresponds to the distance separating one pore from another pore. The organization of the mesoporosity that is described above leads to a structuring of said matrix, which can be lamellar, hexagonal, vermicular, cubic, cholesteric or bicontinuous and preferably vermicular. It should be noted that a porosity that is microporous in nature can also result from the overlapping of the surfactant, used during the preparation of the material according to the invention, with the inorganic wall at the organic-inorganic interface developed during the mesostructuring of the inorganic component of said material according to the invention. The material according to the invention also has an interparticulate textural macroporosity.

The mesostructured matrix that is present in each of the elementary spherical particles of the material according to the invention is, according to a first embodiment of the matrix, composed entirely of oxide of the element X that is selected from the list described above and preferably composed entirely of oxide of the element X that is selected from the preferred list described above (Al, Ti, Zr, Ga, Ge, Ce). Said mesostructured matrix, with an oxide base of at least said element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of aluminum, titanium, zirconium, gallium, germanium and cerium, comprises, according to a second embodiment of the matrix, at least one element X' that is selected from the group that consists of silicon, aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of silicon, aluminum, titanium, zirconium, gallium, germanium and cerium, whereby the elements X and X' are different. According to the second embodiment of the matrix, the proportion of the element X relative to that of the element X' in the composition of the matrix is variable: the element X can be either in the majority or in the minority relative to the element X', whereby the X'/X ratio, always strictly positive, can reach a value of 1000. The element X' is preferably silicon. Very preferably, the element X is aluminum, and the element X' is silicon.

According to the invention, metal nanoparticles are defined as nanometric-size particles comprising at least one metal that belongs to the family of transition metals (columns 3 to 12 of the periodic table according to the IUPAC classification) and/or to the family of rare earth metals (lanthanides and actinides). More specifically, said metal nanoparticles that are trapped in the mesostructured matrix that is present in each of the elementary spherical particles of the material according to the invention comprise, according to a first embodiment of said particles, at least one transition metal of zero oxidation degree belonging to the following non-exhaustive list: Au, Pd, Pt, Ni, Co, Cu, Ag, Rh, Ru, Ir, Fe, and their mixtures and the derived alloys. Said transition metal is preferably selected from among gold, palladium, platinum, nickel, cobalt, iron and their mixtures, and very preferably said transition metal is iron or gold. Said metal nanoparticles comprise, according to a second embodiment of the latter, at least one transition metal oxide and/or at least one rare earth metal oxide, in which said metal belongs to the following non-exhaustive list: Ti, Zr, Nb, Ta, Mo, W, Fe, Co, Cu, Y, La, Ni, Cr, Pd, Pt, Ce, Eu, Nd, Gd and their mixtures. The metal of at least said transition metal oxide and/or the metal of at least said rare earth metal oxide preferably belongs to the following list: Ti, Zr, Nb, Mo, W, Co, Ni, Ce and their mixtures. In addition, the metal oxide nanoparticles that are described according to the second embodiment of said metal particles preferably contain the silicon element in addition to the metal element in oxide form. The metal nanoparticles comprise, according to a third embodiment of the latter, at least one polymetallic oxide of crystallographic structure such as spinel $AB_2O_4$, perovskite $ABO_3$ or ilmenite $ABO_3$, whereby A and/or B is at least one transition metal and/or rare earth. In the spinel-type structure, A and B are respectively divalent and trivalent cations and in the perovskite-type structure, A and B are respectively divalent and tetravalent cations, whereby A and B optionally can be a metal of groups 1 and 2 of the periodic table according to the IUPAC classification when A or B is neither a transition metal nor a rare earth metal. Regarding the ilmenite $ABO_3$, the elements A and B have similar sizes and are defined by the sum of their feedstocks that equals +6. For example and in a non-exhaustive way, the spinel-type mixed metal oxides are preferably the compounds $Fe_3O_4$, $MgFe_2O_4$, $ZnFe_2O_4$, and $CO_3O_4$; the perovskite-type mixed metal oxides are preferably the compounds $BaTiO_3$, $CaTiO_3$, $SrZnO_3$, $SrTiO_3$, $LaFeO_3$, $LaCeCoO_3$, $SrHfO_3$, $SrSnO_3$, and $BaSnO_3$; and the ilmenite-type mixed metal oxides are in particular the compounds $NiMnO_3$ and $FeTiO_3$. According to this third embodiment of said metal nanoparticles, several polymetal oxides of different types (spinel, perovskite, ilmenite) can be trapped in the mesostructured matrix of the same spherical particle. Said metal nanoparticles comprise, according to the fourth embodiment of the latter, at least one chalcogenide that is formed by a transition metal M and a chalcogen element C that is selected from among sulfur, selenium and tellurium, preferably sulfur. The metal chalcogenides that are preferred as metal nanoparticles belong to the following non-exhaustive list: $MoS_2$, $NiS_x$ (x=1 or 2), $Ni_3S_2$, $WS_2$, $Co_9S_8$, PtS, PdS, $RuS_2$, $Rh_2S_3$, $NbS_x$ (x=1, 2 or 3), FeS, $FeS_2$, $Au_2S$, ZnS, CdS and very preferably to the following list: $MoS_2$, $NiS_x$ (x=1 or 2), $Ni_3S_2$, $WS_2$, $CO_9S_8$, PtS, PdS, $RuS_2$, $Rh_2S_3$, $NbS_x$ (x=1, 2 or 3).

According to the invention, the metal nanoparticles advantageously represent from 0.1 to 30% by weight, preferably 0.1 to 20% by weight, and very preferably 0.1 to 10% by weight of the material of the invention. The metal nanoparticles have a maximum size of 300 nm, preferably they have a size of between 1 and 300 nm, and very preferably they have a size of between 2 and 50 nm. Said metal nanoparticles are trapped in the mesostructured matrix of each of the elementary spherical particles of the material according to the invention in the form that is described in one or more of the four embodiments of said nanoparticles that are described above. In particular, the mesostructured matrix of a spherical particle can trap metal nanoparticles that are present in several forms according to the embodiments of said metal nanoparticles that are described above. First metal nanoparticles that are present in one of the forms described above in one of the four embodiments and the second metal nanoparticles that are present in a form (selected from among one of the forms described above in one of the four embodiments) other than that under which said first nanoparticles are presented can be trapped within the mesostructured matrix of the same spherical particle. For example, a transition metal of zero oxidation degree according to the form taken by the metal nanoparticles according to the first embodiment described above and a transition metal oxide according to the form taken by the metal nanoparticles according to the second embodiment that is described above can be trapped in the mesostructured matrix of the same elementary spherical particle of the material according to the invention.

Advantageously, each of the spherical particles also comprises zeolitic nanocrystals. Said zeolitic nanocrystals are trapped with the metal nanoparticles in the mesostructured matrix that is contained in each of the elementary spherical particles. According to this embodiment of the invention that consists in trapping zeolitic nanocrystals in the mesostructured matrix, the material according to the invention, in each of the elementary spherical particles, has both a mesoporosity within the matrix itself (mesopores of uniform size between 1.5 and 30 nm, preferably between 1.5 and 10 nm) and a zeolitic-type microporosity that is generated by the zeolitic nanocrystals that are trapped in the mesostructured matrix. Said zeolitic nanocrystals have a pore size of between 0.2 and 2 nm, preferably between 0.2 and 1 nm, and very preferably between 0.2 and 0.6 nm. Said zeolitic nanocrystals advantageously represent 0.1 to 30% by weight, preferably 0.1 to 20% by weight, and very preferably from 0.1 to 10% by weight of the material of the invention. The zeolitic nanocrystals have a maximum size of 300 nm and preferably have a size of between 10 and 100 nm. Any zeolite, and in particular but in a non-restrictive way those listed in "Atlas of Zeolite Framework Types," 5th Revised Edition, 2001, Ch. Baerlocher, W. M. Meier, D. H. Olson, can be used in the zeolitic nanocrystals that are present in each of the elementary spherical particles that constitute the material according to the invention. The zeolitic nanocrystals preferably comprise at least one zeolite that is selected from among the zeolites ZSM-5, ZSM-48, ZSM-22, ZSM-23, ZBM-30, EU-2 EU-11, silicalite, beta, zeolite A, faujasite, Y, USY, VUSY, SDUSY, mordenite, NU-87, NU-88, NU-86, NU-85, IM-5, IM-12, ferrierite and EU-1. Very preferably, the zeolitic nanocrystals comprise at least one zeolite that is selected from among the zeolites of MFI, BEA, FAU and LTA structural type. Nanocrystals of different zeolites and in particular zeolites of different structural types can be present in each of the spherical particles that constitute the material according to the invention. In particular, each of the spherical particles that constitute the material according to the invention can advantageously comprise at least the first zeolitic nanocrystals of which the zeolite is selected from among the zeolites ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1, preferably from among the zeolites of MFI, BEA, FAU and LTA structural types, and at least second zeolitic nanocrystals of which the zeolite is different from that of the first zeolitic nanocrystals and is selected from among the zeolites ZSM-5, ZSM-48, ZSM-22, ZSM-23, ZBM-30, EU-2, EU-11, silicalite, beta, zeolite A, faujasite, Y, USY, VUSY, SDUSY, mordenite, NU-87, NU-88, NU-86, NU-85, IM-5, IM-12, ferrierite and EU-1, preferably from among the zeolites of MFI, BEA, FAU and LTA structural types. The zeolitic nanocrystals advantageously comprise at least one zeolite that is either entirely silica or that contains, in addition to silicon, at least one element T that is selected from among aluminum, iron, boron, indium and gallium, preferably aluminum.

According to the invention, said elementary spherical particles that constitute the material according to the invention have a diameter that is advantageously between 50 nm and 10 µm, preferably between 50 and 300 nm. More specifically, they are present in the material according to the invention in the form of aggregates. The material according to the invention advantageously has a specific surface area of between 100 and 1100 $m^2/g$ and very advantageously between 200 and 600 $m^2/g$.

This invention also has as its object the preparation of the material according to the invention. Said process comprises a) the synthesis of metal particles of a maximum nanometric size that is equal to 300 nm so as to obtain a stable colloidal solution in which said nanoparticles are dispersed; b) the mixing in solution of at least one surfactant, at least one precursor of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, at least one colloidal solution of metal nanoparticles obtained according to a), optionally at least one precursor of at least one element X' that is selected from the group that consists of silicon, aluminum, titanium, tungsten, zirconium, gallium, germanium, tin, antimony, lead, vanadium, iron, manganese, hafnium, niobium, talantum, yttrium, cerium, gadolinium, europium and neodymium (whereby X and X' are different) and optionally at least one stable colloidal solution in which zeolite crystals of a maximum nanometric size that is equal to 300 nm are dispersed; c) the aerosol spraying of said solution that is obtained in stage b) to lead to the formation of spherical droplets of a diameter of less than 200 μm; d) the drying of said droplets, and e) the elimination of at least said surfactant to obtain a mesostructured material in which metal nanoparticles are trapped.

According to stage a) of the process for the preparation of the material according to the invention, said metal nanoparticles, dispersed in colloidal solution, are obtained via the synthesis operating procedures that are well known to one skilled in the art. Thus, the nanoparticles, dispersed in colloidal solution, comprising at least one transition metal of zero oxidation degree (first embodiment of the nanoparticles described above) are generally developed by reduction of an inorganic salt of said transition metal, whereby said salt advantageously comes in the form $MZ_n$, where M is said transition metal, Z=Cl or Br, and n=2 or 3, by a chemical reducing agent that is soluble in organic medium or else aqueous like a hydrotriorganoboride, a borohydride, a hydrazine, an alcohol (methanol, ethanol, or polyol), an organic compound (aldehyde, ketone, glucose, citrate, etc.) or else a reducing gas (hydrogen, carbon monoxide) (H. Bonnemann, W. Brijoux, R. Brinkmann, E. Dinjus, T. Jouber, R. B. Korall, *Angew. Chem. Int. Ed. Engl.,* 1991, 30, 10, 1312; Y. Nakao, S. Fugishige, *J. of Catal.,* 1992, 74, 323; H. Hirai, *J. Macromol. Sci. Chem.,* 1979, A13, 5, 633; N. Toshima, T. Takahashi, H. Hirai, *Chem. Lett.,* 1985, 1245). One variant to this method consists in developing said nanoparticles from a water microemulsion in an organic phase (M. Boutonnet, J. Kizling, P. Stenius, G. Maire, *Coll And Surf.,* 1982, 5, 209). It is also possible to obtain a colloidal solution in which said metal nanoparticles are dispersed in the form of at least one transition metal of zero oxidation degree by following the procedure by heat decomposition of an organometallic complex of said transition metal (T. Tano, K. Esumi, K. Meguro, *J. Coll. And Interface Sci.,* 1989, 133, 2, 530), by vapor phase condensation (vaporization of the metallic atoms then trapping the latter in solvents cooled in the liquid nitrogen) (K. J. Klabunde, *Platinum Metals Rev.,* 1992, 36, 2, 80), by photoreduction, by radiolysis or else by electrochemical reduction (N. Toshima, T. Takahashi, H. Hirai, *Chem. Lett.,* 1985, 1245; M. Mostafavi, N. Keghouche, M. O. Delcourt, J. Belloni, *Chem. Physics Lett.,* 1990, 167, 3, 193; M. T. Reetz, W. Helbig, *J. Am. Chem. Soc.,* 1994, 116, 7401). The dispersion in solution of metal nanoparticles can be ensured via the presence of stabilizing agents, such as, for example, polymers (polyvinyl alcohol, polystyrene, polyethylene) or compolymers or else anionic surfactants (sodium dodecylsulfate) or cationic surfactants (dodecyltrimethyl ammonium chloride) or by the solvent itself that is used for the implementation of stage a) of the process according to the invention.

The metal nanoparticles, dispersed in colloidal solution, comprising at least one transition metal oxide and/or at least one rare earth metal oxide (second embodiment of metal nanoparticles described above) or else comprising at least one polymetal oxide (third embodiment of the metal nanoparticles described above) can be obtained by a first method that consists in a hydroxylation stage of a metal cation that is obtained from the salt of said transition metal or rare earth metal by acido-basic reaction (addition of an acid or a base) or else by thermohydrolysis reaction followed by a condensation stage that causes reactions of olation or oxolation to take effect leading to nanoparticles. It is also possible to obtain these same metal nanoparticles in the form of at least one transition metal oxide and/or at least one rare earth metal oxide or in the form of at least one polymetal oxide, dispersed in colloidal solution, by a second method that is used from reactions of hydrolysis and condensation of alkoxide precursors of said metal of formula $M(OR)_n$, where M is a transition metal or rare earth, and R is an alkyl group, generally monitored by the presence in solution of a complexing agent (sol-gel method). One skilled in the art, wanting to use one or the other of these methods, can, for whatever purpose it may serve, refer to the following works and publications: J.-P. Jolivet, *Metal Oxide Chemistry and Synthesis. From Solution to Solid State*, J. Wiley and Sons, Chichester, 2000; F. Schüth, K. S. W. Sing, J. Weitkamp, Handbook of Porous Solids, Wiley-VCH, 2002, Volume 3; J. Livage, C. Sanchez, *J. Non Crystalline Solids,* 1992, 145, 11. Finally, a third method for obtaining metal nanoparticles, dispersed in colloidal solution, comprising at least one transition metal oxide and/or at least one rare earth metal oxide (second embodiment of the metal nanoparticles described above) or else comprising at least one polymetal oxide (third embodiment of the metal nanoparticles that are described above) consists in implementing non-hydrolytic processes generally at low temperature, whereby the systems that are studied consist of a metal precursor (salt or alkoxide) in an organic solvent (for example, benzyl alcohol) (M. Niederberger, M. H. Bard, G. D. Stucky, *J. Am. Chem. Soc.,* 2002, 124, 46, 13642).

In the case where said metal nanoparticles comprise not only at least one transition metal oxide and/or at least one rare earth metal oxide, but also the element silicon, the latter is introduced via the combination, in the synthesis operating procedures of one of the three methods described above, of the metal oxide precursor with a silica precursor, the latter able to be obtained from any silica source and advantageously a sodium silicate precursor of formula $SiO_2$, NaOH, a chlorinated precursor of formula $SiCl_4$, an organometallic precursor of formula $Si(OR)_4$, where R═H, methyl, or ethyl, or a chloroalkoxide precursor of formula $Si(OR)_{4-x}Cl_x$, where R═H, methyl or ethyl, whereby x is between 0 and 4.

In the particular case where the metal nanoparticles that are trapped in the mesostructured matrix with an oxide base of at least said element X comprise at least one transition metal of zero oxidation degree (first embodiment of the nanoparticles), it is possible, instead of synthesizing metal nanoparticles directly in their reduced form (zero oxidation degree) as described above according to stage a) of the process according to the invention, to synthesize, during stage a), a stable colloidal solution in which the metal nanoparticles that are dispersed there are in their oxide form of said transition metal then, following stage e) of the process according to the invention, initiating an additional stage f) that consists of a reduction of the oxide of said transition metal such that the transition metal of said metal nanoparticles that are trapped in said mesostructured matrix of each of the spherical particles of the material according to the invention is of zero oxidation degree. The reduction techniques that are used are similar to those that were described previously and are used during stage a) of the process according to the invention when it is a matter of synthesizing metal nanoparticles comprising at least one transition metal of zero oxidation degree. In particular, the additional stage f) of the process for preparation according to the invention can be effectively carried out by reduction of the metal nanoparticles comprising at least one transition metal oxide under atmosphere of a reducing gas (hydrogen, carbon monoxide) in a temperature range that varies from ambient temperature up to T=800° C., and preferably varying from ambient temperature up to T=550° C., whereby the gas flow rate being considered is set in a range of 0.5 to 10 l/h/g of solid and preferably 0.5 to 5 l/h/g of solid.

The metal nanoparticles, dispersed in colloidal solution, comprising at least one transition metal sulfide (fourth embodiment of the metal nanoparticles described above), can be obtained from the following non-exhaustive synthesis techniques: direct sulfurization of the nanoparticles of said transition metal of zero oxidation degree or in its oxidized form (A. Zak, Y. Feldman, V. Alperovich, R. Rosentsveig, R. Tenne, *J. Am. Chem. Soc.,* 2000, 122, 11108), precipitation in non-aqueous solution of a metal salt of said transition metal in the presence of a sulfurizing agent, heat decomposition of the salt of said transition metal in aqueous phase such as thiometallates.

Most of the synthesis methods cited above for the synthesis of metal nanoparticles, dispersed in colloidal solution, under one of the four forms provided in the four embodiments of the metal nanoparticles described above are described in the article by B. L. Cushing, V. L. Kolesnichenko, C. J. O'Conner, *Chem. Rev.,* 2004, 104, 3893.

According to stage a) of the process for the preparation of the material according to the invention, said metal nanoparticles according to the invention can also be commercial (for example, provision by "Rhodia Electronics and Catalysis" of particles of rare earth metal oxide (La, Ce, etc.), by "Millenium Chemicals" of titanium oxide particles, etc.).

According to stage b) of the process for the preparation of the material according to the invention, the precursor of at least one element X that is selected from the group that consists of aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of aluminum, titanium, zirconium, gallium, germanium and cerium, is an inorganic oxide precursor that is well known to one skilled in the art. The precursor of the element X can be any compound that comprises the element X and that can release this element in solution, for example in aqueous organic solution, preferably in acidic aqueous organic solution, in reactive form. In the preferred case where X is selected from the group that consists of aluminum, titanium, zirconium, gallium, germanium and cerium, the precursor of the element X is advantageously an inorganic salt of said element X of formula $XZ_n$ (n=3 or 4), whereby Z is a halogen, the group $NO_3$ or a perchlorate, and Z is preferably chlorine. The precursor for the element X that is being considered can also be an organometallic precursor of formula $X(OR)_n$, where R=ethyl, isopropyl, n-butyl, s-butyl, t-butyl, etc., or a chelated precursor such as $X(C_5H_8O_2)_n$, with n=3 or 4. The precursor of the element X that is being considered can also be an oxide or a hydroxide of the element X. Based on the nature of the element X, the precursor of the element X that is being considered and that is used can also be of the form $XOZ_2$, whereby Z is a monovalent anion such as a halogen or the group $NO_3$. Said element X is preferably selected from the group that consists of aluminum, titanium, zirconium, gallium, germanium and cerium.

According to the process of the invention, at least one precursor of at least one element X' is advantageously added to the mixture according to stage b) of said process. Said element X' is selected from the group that consists of silicon, aluminum, titanium, tungsten, zirconium, gallium, germanium, tin, antimony, lead, vanadium, iron, manganese, hafnium, niobium, tantalum, yttrium, cerium, gadolinium, europium and neodymium, preferably selected from the group that consists of silicon, aluminum, titanium, zirconium, gallium, germanium and cerium (whereby X and X' are different). Said element X' is preferably silicon; said silica precursor is then obtained from any silica source and advantageously from a sodium silicate precursor of formula $SiO_2$, NaOH, a chlorinated precursor of formula $SiCl_4$, an organometallic precursor of formula $Si(OR)_4$ where R=H, methyl, ethyl or a chloroalkoxide precursor of formula $Si(OR)_{4-x}Cl_x$ where R=H, methyl, or ethyl, whereby x is between 0 and 4. The silica precursor can also advantageously be an organometallic precursor of formula $Si(OR)_{4-x}R'_x$, where R=H, methyl, or ethyl, and R' is an alkyl chain or a functionalized alkyl chain, for example by a thiol, amino, β diketone or sulfonic acid group, whereby x is between 0 and 4.

The surfactant that is used for the preparation of the mixture according to stage b) of the process for preparation according to the invention is an ionic or non-ionic surfactant or a mixture of the two. The ionic surfactant is preferably selected from among the phosphonium or ammonium ions and is very preferably among the quaternary ammonium salts such as the cetyltrimethyl ammonium bromide (CTAB). The non-ionic surfactant preferably can be any copolymer that has at least two parts of different polarities imparting to them amphiphilic macromolecule properties. These copolymers can be part of the non-exhaustive list of the following copolymer families: fluorinated copolymers (—[$CH_2$—$CH_2$—$CH_2$—$CH_2$—O—CO—R1- with R1=$C_4F_9$, $C_8F_{17}$, etc.), biological copolymers such as the amine polyacids (poly-lysine, alginates, etc.), dendrimers, block copolymers that consist of poly(alkylene oxide) chains, and any other copolymer with an amphiphilic nature that is known to one skilled in the art (S. Förster, M. Antionnetti, *Adv. Mater.,* 1998, 10, 195-217, S. Förster, T. Plantenberg, *Angew. Chem. Int. Ed.,* 2002, 41, 688-714, H. Cölfen, *Macromol. Rapid Commun,* 2001, 22, 219-252). Within the scope of this invention, a block copolymer that consists of poly(alkylene oxide) chains is preferably used. Said block copolymer is preferably a block copolymer that has two, three or four blocks, whereby each block consists of a poly(alkylene oxide) chain. For a two-block copolymer, one of the blocks consists of a poly(alkylene oxide) chain that is hydrophilic in nature, and the other block consists of a poly(alkylene oxide) chain that is hydrophobic in nature. For a three-block copolymer, two of the blocks consist of a poly(alkylene oxide) chain that is hydrophilic in nature, while the other block, located between the two blocks with hydrophilic parts, consists of a poly(alkylene oxide) chain that is hydrophobic in nature. In the case of a three-block copolymer, the poly(alkylene oxide) chains that are hydrophilic in nature are preferably poly(ethylene oxide) chains that are denoted $(PEO)_x$ and $(PEO)_z$, and the poly(alkylene oxide) chains that are hydrophobic in nature are poly(propylene oxide) chains that are denoted $(PPO)_y$, poly(butylene oxide) chains or mixed chains of which each chain is a mixture of several alkylene oxide monomers. Very preferably, in the case of a three-block copolymer, a compound of formula $(PEO)_x$—$(PPO)_y$—$(PEO)$, is used, where x is between 5 and 300, and y is between 33 and 300, and z is between 5 and 300. The values of x and z are preferably identical. Very advantageously, a compound in which x=20, y=70, and z=20 (P123) and a compound in which x=106, y=70, and z=106 (F127) are very advantageously used. The commercial non-ionic surfactants that are known under the name of Pluronic (BASF), Tetronic (BASF), Triton (Sigma), Tergitol (Union Carbide), and Brij (Aldrich) can be used as non-ironic surfactants in stage b) of the process for preparation of the invention. For a four-block copolymer, two of the blocks consist of a poly (alkylene oxide) chain that is hydrophilic in nature, and the other two blocks consist of a poly(alkylene oxide) chain that is hydrophobic in nature.

According to stage b) of the process for preparation according to the invention, the colloidal solution in which zeolite crystals of a maximum nanometric size that is equal to 300 nm, optionally treated with the synthesis medium, are dispersed is obtained either by prior synthesis, in the presence of a structuring agent, of zeolytic nanocrystals of a maximum nanometric size that is equal to 300 nm or by the use of zeolytic crystals, which have the characteristic of dispersing in the form of nanocrystals of a maximum nanometric size that is equal to 300 nm in solution, for example in acidic aqueous organic solution. Concerning the first variant that consists in a prior synthesis of zeolitic nanocrystals, the latter are synthesized according to operating procedures that are known to one skilled in the art. In particular, the synthesis of beta zeolite nanocrystals was described by T. Bein et al., *Micropor. Mesopor. Mater.*, 2003, 64, 165. The synthesis of Y zeolite nanocrystals was described by T. J. Pinnavaia et al., *J. Am. Chem. Soc.*, 2000, 122, 8791. The synthesis of faujasite zeolite nanocrystals was described in Kloetstra et al., *Microporous Mater.*, 1996, 6, 287. The synthesis of ZSM-5 zeolite nanocrystals was described by R. Mokaya et al., *J. Mater. Chem.* 2004, 14, 863. The synthesis of silicalite nanocrystals (or of the MFI structural type) was described in several publications: R. de Ruiter et al., *Synthesis of Microporous Materials*, Vol. I; M. L. Occelli, H. E. Robson (eds.), Van Nostrand Reinhold, New York, 1992, 167; A. E. Persson, B. J. Schoeman, J. Sterte, J.-E. Otterstedt, *Zeolites*, 1995, 15, 611-619. Zeolitic nanocrystals are generally synthesized by preparing a reaction mixture that contains at least one silica source, optionally at least one source of at least one element T that is selected from among aluminum, iron, boron, indium and gallium, preferably at least one aluminum source, and at least one structuring agent. The reaction mixture is either aqueous or aqueous organic, for example a water-alcohol mixture. The reaction mixture is advantageously put under hydrothermal conditions under an autogenous pressure, optionally by adding gas, for example nitrogen, at a temperature of between 50 and 200° C., preferably between 60 and 170° C., and even more preferably at a temperature that does not exceed 120° C., until the zeolitic nanocrystals are formed. At the end of said hydrothermal treatment, a colloidal solution is obtained in which the nanocrystals are in the dispersed state. The structuring agent can be ionic or neutral according to the zeolite that is to be synthesized. It is common to use structuring agents of the following non-exhaustive list: nitrogen-containing organic cations, elements of the family of alkalines (Cs, K, Na, etc.), ether rings, diamines as well as any other structuring agent that is well known to one skilled in the art. Concerning the second variant that consists in using zeolitic crystals directly, the latter are synthesized by methods that are known to one skilled in the art. Said zeolitic crystals can also be in the form of nanocrystals. Zeolitic crystals of a size of greater than 300 nm, for example between 300 nm and 200 μm that disperse in solution, for example in aqueous organic solution, preferably in acidic aqueous organic solution, are also advantageously used in the form of nanocrystals of a maximum nanometric size that is equal to 300 nm. Obtaining zeolitic crystals that disperse in the form of nanocrystals of a maximum nanometric size that is equal to 300 nm is also possible by carrying out a functionalization of the surface of the nanocrystals. The zeolitic crystals that are used are either in their crude synthesis form, i.e., still containing structuring agent, or in their calcined form, i.e., the form from which said structuring agent has been removed. When the zeolitic crystals that are used are in their crude synthesis form, said structuring agent is eliminated during stage e) of the process for preparation according to the invention.

The solution in which at least one surfactant, at least one precursor of at least said element X, at least one colloidal solution of metal nanoparticles obtained according to a), optionally at least one precursor of at least said element X' (whereby X and X' are different elements) and optionally at least one stable colloidal solution, in which zeolite crystals of a maximum nanometric size that is equal to 300 nm are dispersed, are mixed can be acidic, neutral or basic. Said solution is preferably acidic and has a maximum pH that is equal to 3, preferably between 0 and 2. The acids that are used to obtain an acidic solution with a maximum pH that is equal to 3 are, in a non-exhaustive way, hydrochloric acid, sulfuric acid and nitric acid. Said solution can be aqueous or can be a water-organic solvent mixture, whereby the organic solvent is preferably a water-miscible polar solvent, in particular THF or an alcohol, in this latter case preferably ethanol. Said solution can also be virtually organic, preferably virtually alcoholic, whereby the amount of water is such that the hydrolysis of the inorganic precursors is ensured (stoichiometric amount). Very preferably, said solution in which at least one surfactant, at least one precursor of at least said element X, at least one colloidal solution of metal nanoparticles obtained according to a), optionally at least one precursor of at least said element X' (whereby X and X' are different elements) and optionally at least one stable colloidal solution in which zeolite crystals of a maximum nanometric size that is equal to 300 nm are dispersed, are mixed is an acidic aqueous organic mixture, very preferably an acid water-alcohol mixture.

The amount of metal nanoparticles comprising at least one metal that belongs to the family of transition metals (columns 3 to 12 of the periodic table according to the IUPAC classification) and/or to the family of rare earth metals (lanthanides and actinides) is such that said metal nanoparticles advantageously represent from 0.1 to 30% by weight, preferably from 0.1 to 20% by weight, and very preferably from 0.1 to 10% by weight of the material of the invention.

The amount of zeolitic nanocrystals that are dispersed in the colloidal solution, obtained according to the variant by prior synthesis, in the presence of a structuring agent, of zeolitic nanocrystals of a maximum nanometric size that is equal to 300 nm or according to the variant by the use of zeolitic crystals, which have the characteristic of dispersing in the form of nanocrystals of a maximum nanometric size that is equal to 300 nm in solution, for example in acidic aqueous organic solution, optionally introduced during stage b) of the process for preparation according to the invention, is such that the zeolitic nanocrystals advantageously represent from 0.1 to 30% by weight, preferably from 0.1 to 20% by weight, and very preferably from 0.1 to 10% by weight of the material of the invention.

The initial concentration of surfactant that is introduced into the mixture according to stage b) of the process for preparation according to the invention is defined by $c_o$, and $c_o$ is defined relative to the critical micellar concentration ($c_{mc}$) that is well known to one skilled in the art. The $c_{mc}$ is the boundary concentration beyond which the self-arrangement phenomenon of the surfactant molecules takes place in the solution. The concentration $c_o$ can be less than, equal to or greater than the $c_{mc}$; preferably it is less than the $c_{mc}$. In a preferred implementation of the process according to the invention, the concentration $c_o$ is less than the $c_{mc}$, and said solution that is targeted in stage b) of the process for preparation according to the invention is an acid water-alcohol mixture. In the case where the solution that is targeted in stage b) of the process for preparation according to the invention is a water-organic solvent mixture, preferably acidic, it is essential during stage b) of the process for preparation according to the invention that the surfactant concentration at the origin of the mesostructuring of the matrix be less than the critical micellar concentration such that the evaporation of said aqueous organic solution, preferably acidic, during stage c) of the process for preparation according to the invention by the aerosol technique induces a micellization or self-assembly phenomenon leading to the mesostructuring of the matrix of the material according to the invention around metal nanoparticles and optionally zeolitic nanocrystals that remain unchanged in their shape and their size during stages c) and d) of the process for preparation of the invention. When $c_o < c_{mc}$, the mesostructuring of the matrix of the material according to the invention and prepared according to the process that is described above is consecutive to a gradual concentration, within each droplet, of at least the precursor of said element X, optionally at least one precursor of said element X', and surfactant, up to a surfactant concentration $c > c_{mc}$ that results from an evaporation of the aqueous organic solution, preferably acidic.

In general, the increase of the joint concentration of the precursor of said element X, optionally the precursor of said element X', hydrolyzed, and the surfactant causes the precipitation of the hydrolyzed precursor of said element X and optionally of the hydrolyzed precursor of said element X' around the self-organized surfactant and consequently the structuring of the matrix of the material according to the invention. By a cooperative self-assembly mechanism, the interactions of inorganic/inorganic phases, organic/organic phases, and organic/inorganic phases lead to the condensation of the precursor of said hydrolyzed element X and optionally the precursor of said hydrolyzed element X' around the self-organized surfactant. During this self-assembly phenomenon, the metal nanoparticles and optionally the zeolitic nanocrystals are trapped in said mesostructured matrix with an oxide base of at least said element X and optionally with a base of said element X' (whereby the elements X and X' are different), included in each of the elementary spherical particles that constitute the material of the invention. The aerosol technique is particularly advantageous for the implementation of stage c) of the process for preparation of the invention so as to force the reagents that are present in the initial solution to interact with one another, no loss of material save the solvents, i.e., the solution, preferably the aqueous solution, preferably acidic, and optionally treated with a polar solvent, being possible, the entire element X, optionally the element X', and metal nanoparticles, optionally zeolitic nanocrystals, initially present thus being perfectly preserved for the entire process of the invention instead of being potentially eliminated during stages of filtration and washing encountered in standard synthesis processes that are known to one skilled in the art.

The stage for spraying the mixture according to stage c) of the process for preparation according to the invention produces spherical droplets of a diameter that is less than 200 μm and preferably in the range of between 50 nm and 20 μm. The size distribution of these droplets is lognormal. The aerosol generator that is used here is a commercial device of model 3078, provided by TSI. The spraying of the solution is done in a chamber into which is sent a carrier gas, an $O_2/N_2$ mixture (dry air), under a pressure P that is equal to 1.5 bar. According to stage d) of the process for preparation according to the invention, drying of said droplets is initiated. This drying is carried out by the transport of said droplets via the carrier gas, the $O_2/N_2$ mixture, in glass tubes, which leads to the gradual evaporation of the solution, for example of the acidic aqueous organic solution, and thus to obtaining spherical elementary particles. This drying is completed by a passage of said particles into a furnace whose temperature can be adjusted, the usual range of temperature varying from 50 to 600° C. and preferably from 80 to 400° C., whereby the dwell time of these particles in the furnace is on the order of one second. The particles are then collected in a filter and constitute the material according to the invention. A pump that is placed at the circuit end promotes the routing of the radicals into the aerosol experimental device. The drying of the droplets according to stage d) of the process for preparation according to the invention is advantageously followed by a passage in the oven at a temperature of between 50 and 150° C. The elimination of the surfactant and optionally the structuring agent that is used for synthesizing said zeolitic nanocrystals, according to stage e) of the process for preparation according to the invention so as to obtain the mesostructured material according to the invention, is advantageously carried out by chemical extraction processes or by heat treatment and preferably by calcination in air in a temperature range of 300 to 1000° C. and more specifically in a range of 500 to 600° C. for a period of 1 to 24 hours and preferably for a period of 2 to 6 hours.

The mesostructured material according to the invention that consists of elementary spherical particles comprising metal nanoparticles that are trapped in an oxide mesostructured matrix can be obtained in the form of powder, balls, pellets, granules, or extrudates, whereby the shaping operations are carried out by the standard techniques that are known to one skilled in the art. The material according to the invention is preferably obtained in powder form, which consists of elementary spherical particles that have a maximum diameter of 10 μm, which facilitates the possible diffusion of reagents in the case of the use of the material according to the invention in a potential industrial application.

The mesostructured material according to the invention that consists of elementary spherical particles comprising metal nanoparticles that are trapped in an oxide mesostructured matrix, having an organized and uniform porosity in the field of mesoporosity, is characterized by several analysis techniques and in particular by low-angle x-ray diffraction (low-angle DRX), by high-angle x-ray diffraction (high-angle DRX), by volumetric analysis with nitrogen (BET), by transmission electron microscopy (TEM), by scanning electronic microscopy (SEM) and by plasma emission spectrometry induced by high frequency (ICP).

The low-angle x-ray diffraction technique (values of the angle 2θ of between 0.5 and 6°) makes it possible to characterize the periodicity on the nanometric scale generated by the organized mesoporosity of the mesostructured matrix of the material of the invention. In the following specification, the x-ray analysis is carried out on powder with a diffractometer that operates by reflection and is equipped with a rear monochromatic illuminator by using the radiation of the copper (wavelength of 1.5406 Å). The peaks that are usually observed on the diffractograms that correspond to a given value of the angle $2\theta$ are associated with inter-reticular distances $d_{(hkl)}$ that are characteristic of the structural symmetry of the material ((hkl) being the Miller indices of the reciprocal network) by Bragg's equation: $2 d_{(hkl)}*\sin(\theta)=\eta*\lambda$. This indexing then makes possible the determination of the mesh parameters (abc) of the direct network, whereby the value of these parameters is based on the hexagonal, cubic, vermicular, cholesteric, lamellar, or bicontinuous structure that is obtained. For example, the low-angle x-ray diffractogram of a mesostructured material according to the invention that consists of elementary spherical particles comprising an oxide mesostructured matrix that is based on silicon and aluminum obtained according to the process for preparation according to the invention via the use of the quaternary ammonium salt that is the cetyltrimethyl ammonium bromide $CH_3(CH_2)_{15}N(CH_3)_3Br$ (CTAB) has a perfectly resolved correlation peak corresponding to the correlation distance between pores d that is characteristic of a vermicular-type structure and defined by Bragg's equation $2 d*\sin(\theta)=\eta*\lambda$.

The technique of high-angle x-ray diffraction (values of the angle $2\theta$ of between 5 and 100°) makes it possible to characterize a crystallized solid that is defined by the repetition of a unitary pattern or elementary mesh on the molecular scale. It follows the same physical principle as the one controlling the low-angle x-ray diffraction technique. The high-angle DRX technique is therefore used to analyze the materials of the invention because it is quite particularly suited to the structural characterization of the metal nanoparticles that can be crystallized, and optionally zeolitic nanocrystals, that are present in each of the elementary spherical particles that constitute the material that is defined according to the invention. In particular, it makes it possible to access the size of the pores of the zeolitic nanocrystals during the presence of the latter. For example, a mesostructured material according to the invention, obtained according to the process for preparation according to the invention and consisting of elementary spherical particles comprising iron oxide metal nanoparticles $\gamma\text{-}Fe_2O_3$ that are trapped in an oxide mesostructured matrix that is based on aluminum and silicon and is obtained via the use of the quaternary ammonium salt that is the cetyltrimethyl ammonium bromide $CH_3(CH_2)_{15}N(CH_3)_3Br$ (CTAB), presents, in high-angle DRX, the diffractogram that is associated with the symmetry group fd3m of the high-angle crystallized iron oxide nanoparticles, and in low-angle DRX, a perfectly resolved small-angle correlation peak associated with the vermicular-type structure of the mesostructured matrix that corresponds to a distance d for correlation between pores. During the optional presence of zeolite nanocrystals that are trapped in said oxide mesostructured matrix, for example ZSM-5 (MFI)-type zeolite nanocrystals, the associated high-angle diffractogram exhibits, in addition to the peaks associated with said iron oxide metal nanoparticles, the peaks that are attributed to the symmetry group Pnma (No. 62) of the ZSM-5 zeolite. The value of the angle that is obtained on the RX diffractogram makes it possible to return to the correlation distance d according to Bragg's law: $2 d*\sin(\theta)=\eta*\lambda$.

The volumetric analysis with nitrogen corresponding to the physical adsorption of nitrogen molecules in the pores of the material via a gradual increase of pressure at a constant temperature provides information on the particular textural characteristics (pore diameter, type of porosity, specific surface area) of the material according to the invention. In particular, it makes it possible to access the specific surface area and the mesopore distribution of the material. Specific surface area is defined as the B.E.T. specific surface area ($S_{BET}$ in $m^2/g$) determined by adsorption of nitrogen according to the ASTM D 3663-78 standard established from the BRUNAUER-EMMETT-TELLER method described in the periodical "*The Journal of American Society,*" 1938, 60, 309. The pore distribution that is representative of a mesopore population centered in a range of 1.5 to 50 nm is determined by the Barrett-Joyner-Halenda (BJH) model. The adsorption-desorption isotherm of nitrogen according to the BJH model that is thus obtained is described in the periodical "*The Journal of American Society,*" 1951, 73, 373, written by E. P. Barrett, L. G. Joyner and P. P. Halenda. In the following specification, the diameter of the mesopores $\phi$ of the mesostructured matrix corresponds to the mean diameter with the nitrogen adsorption defined as being a diameter such that all of the pores that are less than this diameter constitute 50% of the pore volume (Vp) measured on the adsorption branch of the nitrogen isotherm. In addition, the form of the nitrogen adsorption isotherm and the hysteresis loop can provide information on the nature of the mesoporosity and on the possible presence of microporosity essentially linked to the zeolitic nanocrystals when they are present in the oxide mesostructured matrix. For example, the nitrogen adsorption isotherm relative to a mesostructured material according to the invention and obtained according to the process for preparation according to the invention and consisting of elementary spherical particles comprising an oxide mesostructured matrix based on aluminum and silicon prepared via the use of quaternary ammonium salt, cetyltrimethyl ammonium bromide $CH_3(CH_2)_{15}N(CH_3)_3Br$ (CTAB), is characterized by an adsorption isotherm of class IVc with the presence of an adsorption operation for P/PO values (where PO is the saturating vapor pressure at temperature T) included between 0.2 and 0.3 and associated with the presence of pores on the order of 2 to 3 nm as confirmed by the associated pore distribution curve.

Concerning the mesostructured matrix, the difference between the value of the diameter of the pores $\phi$ and the mesh parameter a defined by low-angle DRX as described above makes it possible to access the magnitude e where $e=a-\phi$, and is characteristic of the thickness of the amorphous walls of the mesostructured matrix, included in each of the spherical particles of the material according to the invention. Said mesh parameter a is connected at distance d for correlation between pores by a geometric factor that is characteristic of the geometry of the phase. For example, in the case of a hexagonal mesh, $e=a-\phi$ with $a=2*d/\sqrt{3}$, and in the case of a vermicular structure, $e=d-\phi$.

The analysis by transmission electron microscopy (TEM) is a technique that is also extensively used to characterize the structure of these materials. The latter makes possible the formation of an image of the solid being studied, whereby the observed contrasts are characteristic of the structural organization, the texture or else the morphology of the observed particles, the resolution of the technique reaching at most 0.2 nm. In the following specification, the TEM photos will be executed from microtome sections of the sample so as to visualize a section of an elementary spherical particle of the material according to the invention. For example, the TEM images that are obtained for a material according to the invention and obtained according to the process for preparation according to the invention and composed of spherical particles that comprise gold metal nanoparticles of zero oxidation degree trapped in a mesostructured matrix that is based on titanium oxide and that was prepared via the use of the quaternary ammonium salt, cetyltrimethyl ammonium bromide $CH_3(CH_2)_{15}N(CH_3)_3Br$ (CTAB), have, within the same spherical particle, a vermicular mesostructure (whereby the material is defined by dark zones) within which opaque objects that represent the gold metal nanoparticles that are trapped in the mesostructured matrix are visualized. The analysis of the image also makes it possible to access the parameters d, φ, and e that are characteristic of the mesostructured matrix defined above. It is also sometimes possible to visualize on this same block the reticular planes of the metal nanoparticles, which can be crystallized, instead of the opaque objects that are cited above, as well as the zeolitic nanocrystals when they are present, in the mesostructured matrix and thus to access their crystallographic structure.

The morphology and the size distribution of the elementary particles have been established by analysis of photos obtained by scanning electronic microscopy (SEM).

The structure of the mesostructured matrix encompassed in each of the particles of the material according to the invention can be cubic, vermicular, hexagonal, lamellar, cholesteric, or bicontinuous based on the nature of the surfactant that is selected as a structuring agent.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding International Application No. PCT/FR06/01111, filed May 17, 2006, and French Application Serial No. 05/05.676, filed Jun. 2, 2005, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention is illustrated by means of the following examples.

EXAMPLES

In the following examples, the aerosol technique that is used is the one that is described above in the specification of the invention.

Example 1

Preparation of a Material that has Gold Metal Nanoparticles with 3% by Weight of the Final Material Trapped in a Mesostructured Matrix of Titanium Oxide $TiO_2$.

50 mg of $AuNaCl_4$, $2H_2O$ is added to 500 ml of $H_2O$. The solution is brought to a boil in a water bath. 10 mg of the aqueous solution that contains 0.5 g of $Na_3$ ($C_6H_8O_7$) is then added. All of the solution is allowed to boil until it turns the color red. Gold nanoparticles of a mean diameter on the order of 20 nm in suspension are then obtained (J. Turkevitch, P. C. Stevenson, J. Hillier, *Discuss. Faraday Soc.*, 1951, 11, 55). The solution is then concentrated by evaporation until a solution of the concentration 0.014 mol/l is obtained.

Figure 1:
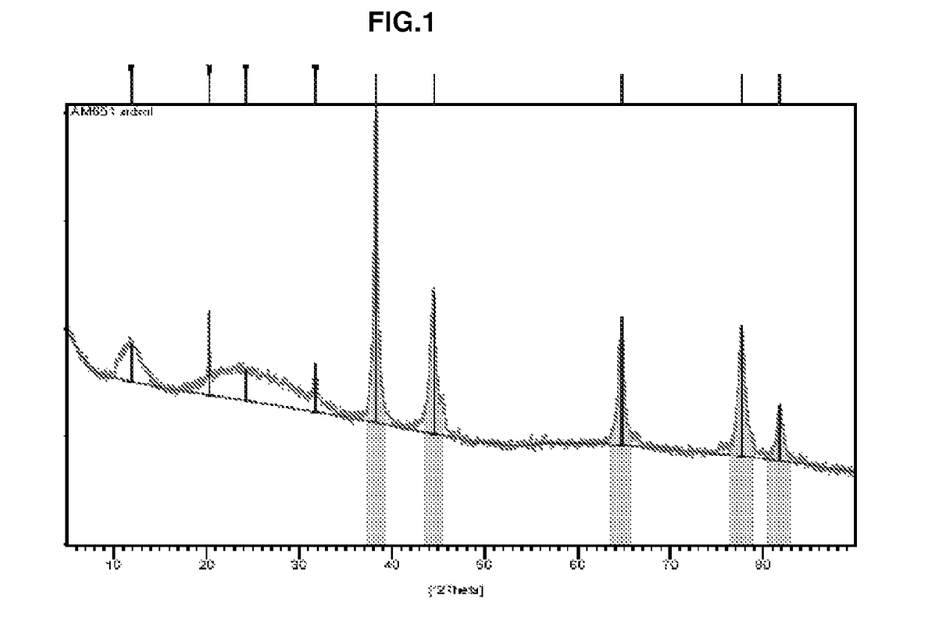
FIGS. 1-7 are graphic representations of various characterizing properties of the solids of the invention.
Figure 2:
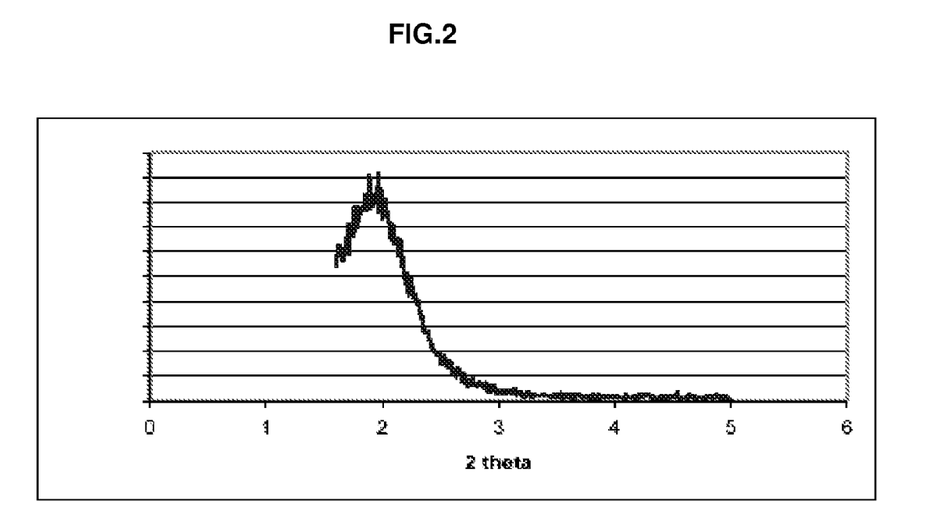

0.41 g of CTAB is dissolved in 23 g of ethanol at ambient temperature. 0.87 g of $TiCl_4$ is added to this solution while being stirred vigorously. After 5 ml of the gold nanoparticle solution is added, the solution is passed through ultrasound for about one minute. 2.2 g of $H_2O$ is then added slowly. The solution is ultrasonically homogenized for about one minute. The entire preparation is sent immediately into the atomization chamber of the aerosol generator as it was described in the description above, and the solution is sprayed in the form of fine droplets under the action of the carrier gas (dry air) that is introduced under pressure (P=1.5 bar). The droplets are dried according to the operating procedure that is described in the specification of the invention above. The temperature of the drying furnace is set at 350° C. The collected powder is then calcined under air for 5 hours at T=550° C. The solid is characterized by low-angle DRX and by high-angle DRX, by volumetric analysis with nitrogen, by TEM and by SEM. The TEM analysis shows that the final material consists of gold nanoparticles that are trapped in a titanium oxide matrix with organized mesoporosity that is characterized by a vermicular structure. The analysis by volumetric analysis with nitrogen leads to a specific surface area of the final material of $S_{BET}$=250 $m^2/g$ and to a mesoporous diameter that is characteristic of the mesostructured matrix of titanium oxide of φ=2.6 nM. The high-angle DRX analysis (FIG. 1) leads to obtaining the diffractogram that is characteristic of the gold nanoparticles. The small-angle DRX (FIG. 2) leads to the visualization of a correlation peak that is associated with the vermicular organization of the mesostructured matrix. Bragg's equation provides 2 d*sin(1)=1.5406, or d=4.4 nm. The thickness of the amorphous walls of the mesostructured matrix that is defined by e=d−φ is therefore e=1.8 nm. An SEM block of the elementary spherical particles thus obtained indicates that these particles have a size that is characterized by a diameter that varies from 50 to 700 nm, whereby the size distribution of these particles is centered around 300 nm.

Example 2

Preparation of a Material that has Iron Oxide Nanoparticles with 10% by Weight of the Final Material Trapped in an Oxide Mesostructured Matrix with an Aluminum and Silicon Base of a Molar Ratio Si/Al=4

80 ml of an $FeCl_3$ solution of concentration 1 mol/l and 20 ml of a solution of $FeCl_2$ at a concentration of 2 mol/l of $FeCl_2$ and 1 mol/l of HCl are prepared. These two solutions are mixed and stirred for about 10 minutes. With a titrimeter, the synthesis of the iron oxide particles is carried out by precipitation of the iron solution in 500 ml of an $NaNO_3$ solution at 3 mol/l. During the synthesis, the pH is kept at a value of 11 by simultaneous addition of a soda solution with a concentration of 0.1 mol/l. The solid particles are separated from the supernatant by magnetization. The particles are then redispersed in an aqueous solution of $HClO_4$ at 3 mol/l and left for 30 minutes while being stirred so as to carry out the oxidation of the residual Fe(II). The particles are then separated from the supernatant by centrifuging (10 minutes at 11,000 rpm).

This procedure can be carried out several times. The particles are then redispersed in a volume of water whose pH is to be kept at a value of 1.8-2.0 so as to obtain an $Fe^{3+}$ concentration on the order of 0.13 mol/l. The diameter of the particles that are obtained is between 5 and 12 nm.

Figure 3:
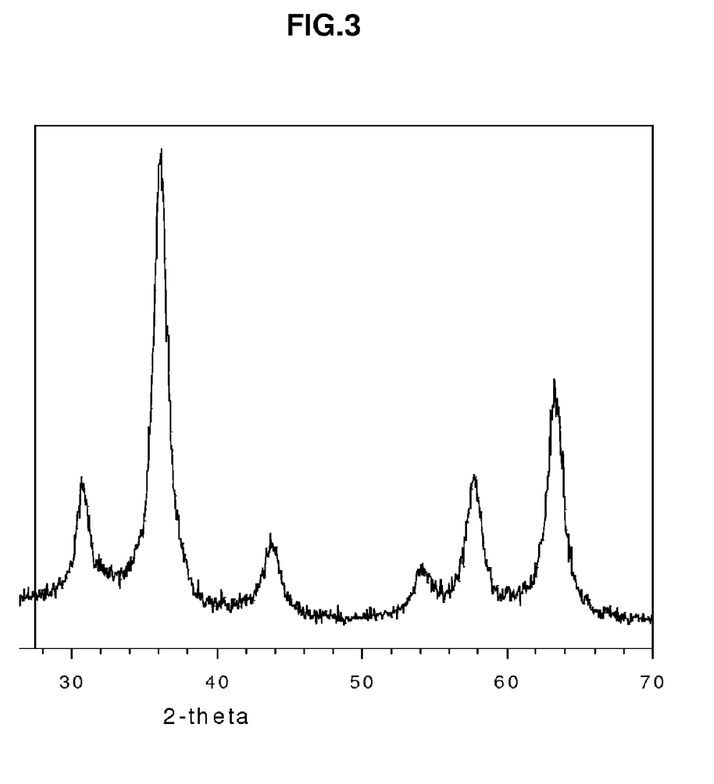
Figure 4:
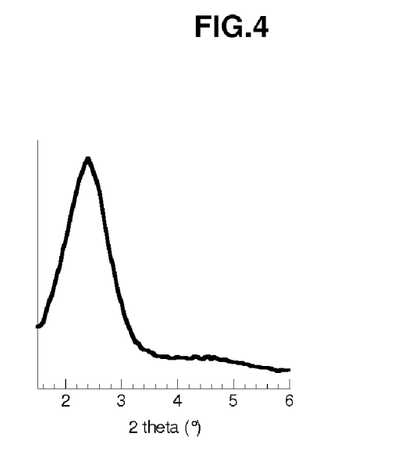
Figure 5:
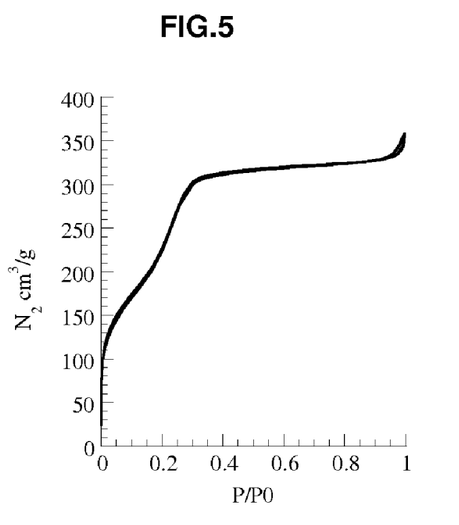

2.3 g of $AlCl_3$, $6H_2O$, is added to a solution that contains 32.45 g of ethanol, 16.93 g of $H_2O$ and 0.078 ml of 37% HCl. Once the aluminum chloride is dissolved, 31 ml of the iron oxide particle aqueous solution that is described above is added to this solution. This solution is placed in ultrasound for several minutes (2 to 3) before the very slow addition and very vigorous stirring of 7.9 g of tetraethyl orthosilicate (TEOS). Then, a solution that contains 3.08 g of CTAB, previously dissolved in 32.45 g of ethanol and in 16.93 g of $H_2O$, is added very slowly and stirred very vigorously. The stirring of the whole mixture is continued for several minutes. The whole mixture is sent into the atomization chamber of the aerosol generator as it was described in the description above, and the solution is sprayed in the form of fine droplets under the action of the carrier gas (dry air) introduced under pressure (P=1.5 bar). The droplets are dried according to the operating procedure that is described in the specification of the invention above. The temperature of the drying furnace is set at 350° C. The collected powder is then calcined in air for 5 hours at T=550° C. The solid is characterized by low-angle DRX and high-angle DRX, by volumetric analysis with nitrogen, by TEM, by SEM and by ICP. The TEM analysis shows that the final material consists of iron oxide nanoparticles in an aluminosilicate matrix with a molar ratio Si/Al=4 with organized mesoporosity that is characterized by a vermicular structure. The volumetric analysis of adsorption with nitrogen (FIG. 5) leads to a specific surface area of the final material of $S_{BET}$=700 m²/g and to a mesoporous diameter that is characteristic of the mesostructured matrix of $\phi$=2.5 nm. The high-angle DRX analysis (FIG. 3) leads to obtaining the diffractogram that is characteristic of the iron oxide $\gamma$-$Fe_2O_3$ nanoparticles of spinel structure and of space group fd3m. The small-angle DRX analysis (FIG. 4) leads to the visualization of a correlation peak associated with the vermicular organization of the mesostructured matrix. The size of the nanoparticles that is calculated from Scherrer's equation is on the order of 8.2 nm. Bragg's equation provides 2 d*sin(1.1)= 1.5406, or d=4 nm. The thickness of the amorphous walls of the aluminsolicate mesostructured matrix that is defined by e=d−$\phi$ is therefore e=1.5 nm. An SEM block of the spherical elementary particles thus obtained indicates that these particles have a size that is characterized by a diameter that varies from 50 to 700 nm, whereby the size distribution of these particles is centered around 300 nm.

Example 3

Preparation of a Material that has Cerium Oxide Nanoparticles at 10% by Weight of the Final Material Trapped in an Oxide Mesostructured Matrix with a Zirconium and Silicon Base of Molar Ratio Si/Zr=4

Figure 6:
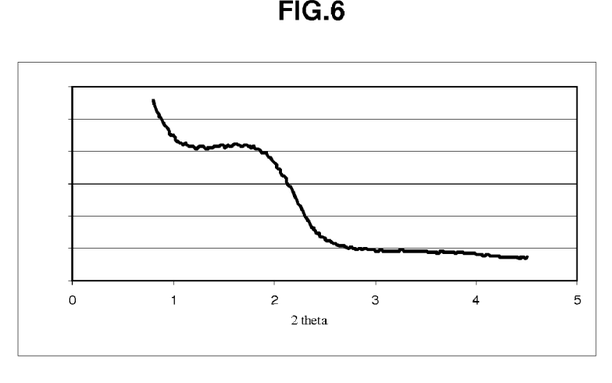
Figure 7:
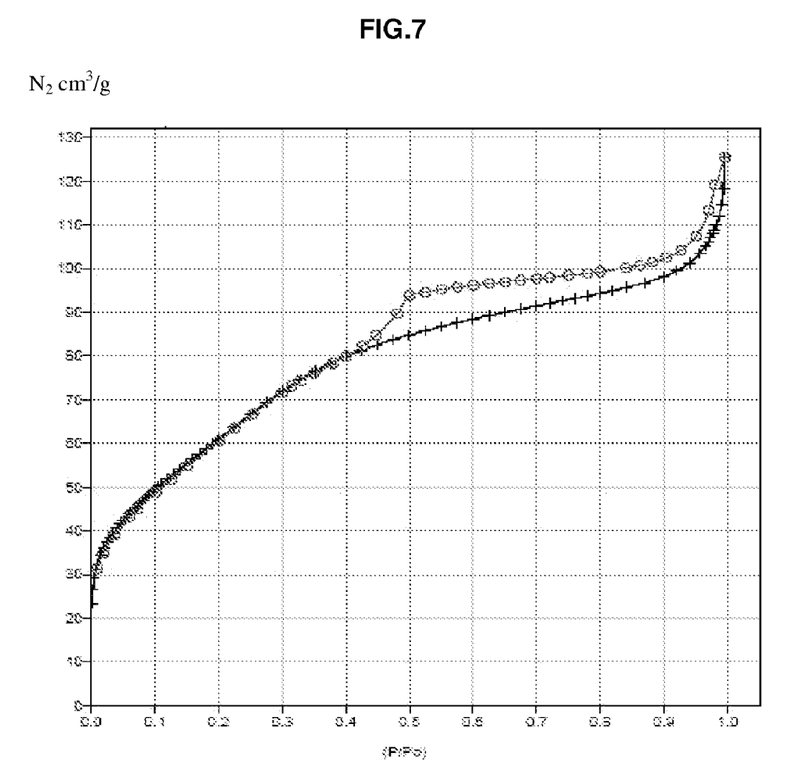

The particles of cerium oxide $CeO_2$ are provided in the form of aqueous solution with 60% by mass of cerium oxide by the Rhodia Company. The particles have a mean diameter on the order of 2 to 3 nm. 12.49 g of this commercial solution is then added to 150 ml of $H_2O$. Then, a solution with a theoretical concentration of 0.29 mol/l of $Ce^{4+}$ is obtained. 2.2 g of $ZrCl_4$ is then slowly added to 65 g of ethanol at ambient temperature. 34 g of $H_2O$ is then added very slowly and while being stirred vigorously. 3.08 g of CTAB and then, still very slowly, 7.8 g of tetraethyl orthosilicate (TEOS) are then added. 6 ml of the cerium oxide solution with a concentration of 0.29 mol/l is then added to the solution that contains the inorganic precursor $ZrCl_4$ by a so-called "stop-flow" system (or quick-mixing device). This device makes it possible to obtain a mixing time that is long enough to ensure a good homogenization of the reagents and that is short enough to prevent the destabilization of the solution. The thus obtained solution is sent into the small-volume pre-chamber of the quick-mixing device, then into the atomization chamber of the aerosol generator as it was described in the description above, and the solution is sprayed in the form of fine droplets under the action of the carrier gas (dry air) that is introduced under pressure (P=1.5 bar). The droplets are dried according to the operating procedure that is described in the specification of the invention above. The temperature of the drying furnace is set at 350° C. The collected powder is then calcined under air for 5 hours at T=550° C. The solid is characterized by low-angle DRX and by high-angle DRX, by volumetric analysis with nitrogen, by TEM and by SEM and by ICP. The TEM analysis shows that the final material consists of cerium oxide nanoparticles in an $SiO_2$—$ZrO_2$ matrix with molar ratio Si/Zr=4 with an organized mesoporosity that is characterized by a vermicular structure. The analysis by volumetric analysis with nitrogen (FIG. 7) leads to a specific surface area of the final material of $S_{BET}$=220 m²/g and to a mesoporous diameter that is characteristic of the mesostructured matrix of $\phi$=2.0 nm. The high-angle DRX analysis leads to obtaining the diffractogram that is characteristic of the cerium oxide nanoparticles. The small-angle DRX analysis (FIG. 6) leads to the visualization of a correlation peak associated with the vermicular organization of the mesostructured matrix. Bragg's equation provides 2 d*sin(1.9)=1.5406, or d=5 nm. The thickness of the amorphous walls of the mesostructured matrix that is defined by e=d−$\phi$ is therefore e=3 nm. An SEM block of the spherical elementary particles thus obtained indicates that these particles have a size that is characterized by a diameter that varies from 50 to 700 nm, whereby the size distribution of these particles is centered around 300 nm.

Example 4

Preparation of a Material that has Polymetal Nanoparticles $CoFe_2O_4$ with a Reverse Spinel Structure at 5% by Weight of Final Material Trapped in an Oxide Mesostructured Matrix with an Aluminum and Silicon Base of Molar Ratio Si/Al=4

8.1 g of $FeCl_2$ and 4.4 g of $Co(CH_3COO)_2$, $4H_2O$ is added to 250 ml of 1,2-propanediol so as to obtain a solution with a metal concentration that is equal to 0.3 mol/l. Then, 10.35 g of $H_2O$ and 14.8 g of $NaCH_3COO$ are added so as to obtain the molar ratios $H_2O$//(Fe+Co) and $CH_3COO^-$/(Fe+Co) that are respectively equal to 9 and 3. The solution is heated to its boiling point at 160° C. with an upgrade of 6° C.min$^{-1}$ and refluxed for 5 hours. The solution is allowed to cool to ambient temperature, and the particles are separated from the supernatant by centrifuging, washed with ethylene glycol and with acetone, and then dried in air at 50° C. The polymetal particles of $FeCO_2O_4$ that are thus obtained have a mean diameter of 5 nm (S. Ammar, A. Helfen, N. Jouini, F. Fiévet, I. Rosenman, F. Villain, P. Moliniè, M. Danot, *J. Mater. Chem.*, 2001, 11, 186). The thus collected particles are redispersed in a volume of 1,2-propanediol so as to obtain a concentration of 0.03 mol/l of metal particles.

1.03 g of $AlCl_3$, $6H_2O$ is added to a solution that contains 30 g of ethanol, 15 g of $H_2O$, 0.036 ml of HCl, and 1.4 g of P123. Once the aluminum chloride is dissolved, 3.59 g of TEOS is added to this solution.

30 ml of the $FeCO_2O_4$ nanoparticle solution of concentration 0.03 mol/l is then added to the solution that contains the inorganic precursors of silicon and aluminum by a so-called "stop-flow" system (or quick-mixing device). This device makes it possible to obtain a mixing time that is long enough to ensure a good homogenization of the reagents and short enough to prevent that destabilization of the solution. The thus obtained solution is sent into the small-volume pre-chamber of the quick-mixing device, then into the atomization chamber of the aerosol generator as it was described in the description above, and the solution is sprayed in the form of fine droplets under the action of the carrier gas (dry air) that is introduced under pressure (P=1.5 bar). The droplets are dried according to the operating procedure that is described in the specification of the invention above. The temperature of the drying furnace is set at 350° C. The collected powder is then calcined in air for 5 hours at T=550° C. The solid is characterized by low-angle DRX and by high-angle DRX, by volumetric analysis with nitrogen, by TEM, by SEM and by ICP. The TEM analysis shows that the final material consists of $CoFe_2O_4$ nanoparticles that are trapped in an aluminosilicate matrix with organized mesoporosity that is characterized by a vermicular structure. The analysis by volumetric analysis with nitrogen leads to a specific surface area of the final material of $S_{BET}=300$ m²/g and to a mesoporous diameter that is characteristic of the mesostructured matrix of $\phi=5.6$ nm. The high-angle DRX analysis leads to obtaining a diffractogram that is characteristic of the $CoFe_2O_4$ nanoparticles. The small-angle DRX analysis leads to the visualization of a correlation peak associated with the vermicular organization of the mesostructured matrix. Bragg's equation provides 2 d*sin(0.32)=1.5406, or d=13.1 nm. The thickness of the amorphous walls of the mesostructured matrix that is defined by $e=d-\phi$ is therefore e=7.5 nm. An SEM block of the spherical elementary particles thus obtained indicates that these particles have a size that is characterized by a diameter that varies from 50 to 700 nm, whereby the size distribution of these particles is centered around 300 nm.

Example 5

Preparation of a Material that has ZSM-5-Type Zeolite Nanocrystals and Iron Oxide $\gamma$-$Fe_2O_3$ Nanoparticles in an Oxide Mesostructured Matrix with an Aluminum and Silicon Base and with a Molar Ratio of Si/Al=4

6.0 g of TEOS is hydrolyzed in 10.4 ml of tetrapropylammonium hydroxide solution (TPAOH 20%). 1.5 ml of water is then added, and the solution is then stirred so as to obtain a clear solution. The solution is autoclaved at T=80° C. for 4 days. Once the synthesis is terminated, ZSM-5 crystals are recovered by centrifuging (20,000 rpm for one hour); they are then redispersed in water (ultrasound) then recentrifuged until the solution, after redispersion, has a pH that is close to 7. The mean size of the ZSM-5 crystals is 100 nm. 80 ml of an $FeCl_3$ solution with a concentration of 1 mol/l and 20 ml of a solution of $FeCl_2$ at a concentration of 2 mol/l of $FeCl_2$ and 1 mol/l of HCl are prepared. These two solutions are mixed and stirred for about 10 minutes. With a titrimeter, the synthesis of the iron oxide particles is carried out by precipitation of the iron solution in 500 ml of an $NaNO_3$ solution at 3 mol/l. During the synthesis, the pH is kept at a value of 11 by simultaneous addition of a soda solution with a concentration of 0.1 mol/l. The solid particles are separated from supernatant by magnetization. The particles are then redispersed in an aqueous solution of $HClO_4$ at 3 mol/l and stirred for 30 minutes so as to carry out the oxidization of residual Fe(II). The particles are then separated from the supernatant by centrifuging (10 minutes at 11,000 rpm). This procedure can be carried out several times. The particles are then redispersed in a volume of water whose pH is to be kept at a value of 1.8-2.0 so as to obtain a concentration of $Fe^{3+}$ on the order of 0.13 mol/l. The diameter of the particles that are obtained is between 5 and 12 nm.

1.03 g of $AlCl_3, 6H_2O$ is added to a solution that contains 30 g of ethanol, 15 g of $H_2O$, 0.036 ml of HCl and 1.4 g of P123. Once the aluminum chloride is dissolved, 3.59 g of TEOS is added. It is allowed to homogenize for about 10 minutes. Then, 400 µl of the zeolitic crystal solution is added to this solution while being stirred vigorously. The pH is then adjusted to 2 with HCl.

12 ml of the iron oxide solution with a concentration of 0.13 mol/l is then added to the solution that contains the zeolitic nanocrystals in suspension and the inorganic precursors of aluminum and silicon by a so-called "stop-flow" system (or quick-mixing device). This device makes it possible to obtain a mixing time that is long enough to ensure a good homogenization of the reagents and short enough to prevent the destabilization of the solution. The thus obtained solution is sent into the small-volume pre-chamber of the quick-mixing device, then into the atomization chamber of the aerosol generator as it was described in the description above, and the solution is sprayed in the form of fine droplets under the action of the carrier gas (dry air) that is introduced under pressure (P=1.5 bar). The droplets are dried according to the operating procedure that is described in the specification of the invention above. The temperature of the drying furnace is set at 350° C. The collected powder is then calcined in air for 5 hours at T=550° C. The solid is characterized by low-angle DRX and by high-angle DRX, by volumetric analysis with nitrogen, by TEM, by SEM, and by ICP. The TEM analysis shows that the final material consists of ZSM-5-type zeolite nanocrystals and iron oxide $\gamma$-$Fe_2O_3$ nanoparticles that are trapped in an aluminosilicate matrix with organized mesoporosity that is characterized by a vermicular structure. The analysis by volumetric analysis with nitrogen leads to a specific surface area of the final material of $S_{BET}=300$ m²/g and to a mesoporous diameter that is characteristic of the mesostructured matrix of $\phi=5.6$ nm. The high-angle DRX analysis leads to obtaining a diffractogram that consists of the superposition of the diffractograms that are characteristic of the ZSM-5 zeolite and the iron oxide $\gamma$-$Fe_2O_3$ nanoparticles. The small-angle DRX analysis leads to the visualization of a correlation peak that is associated with the vermicular organization of the mesostructured matrix. Bragg's equation provides 2 d*sin(0.32)=1.5406, or d=13.1 nm. The thickness of the amorphous walls of the mesostructured matrix that is defined by $e=d-\phi$ is therefore e=7.5 nm. An SEM block of the spherical elementary particles that are thus obtained indicates that these particles have a size that is characterized by a diameter that varies from 50 to 700 nm, whereby the size distribution of these particles is centered around 300 nm.

The invention claimed is:

1. An inorganic material consisting of at least two elementary spherical particles, each of said spherical particles comprising metal nanoparticles that are between 1 and 300 nm in size, said metal nanoparticles comprising at least one transition metal oxide and/or at least one rare earth metal oxide in which said metal is Ti, Zr, Nb, Ta, Mo, W, Fe, Co, Cu, Y, La, Ni, Cr, Pd, Pt, Ce, Eu, Nd, Gd or mixtures thereof, said metal nanoparticles being trapped within a mesostructured matrix with an oxide base of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, whereby said mesostructured matrix has a pore size of between 1.5 and 30 nm and has amorphous walls with a thickness of between 1 and 30 nm, said elementary spherical particles having a maximum diameter of 10 µm.

2. The material according to claim 1, wherein element X is aluminum, titanium, zirconium, gallium, germanium or cerium.

3. The material according to claim 1, wherein the pore size of said mesostructured matrix is between 1.5 and 10 nm.

4. The material according to claim 1, wherein said mesostructured matrix has a hexagonal, cubic, vermicular, lamellar, cholesteric or bicontinuous structure.

5. The material according to claim 1, wherein said mesostructured matrix comprises at least one element X' that is silicon, aluminum, titanium, tungsten, zirconium, gallium, germanium, tin, antimony, lead, vanadium, iron, manganese, hafnium, niobium, tantalum, yttrium, cerium, gadolinium, europium or neodymium, whereby the elements X and X' are different.

6. The material according to claim 5, wherein said element X is aluminum and said element X' is silicon.

7. The material according to claim 1, wherein said metal nanoparticles comprise at least one transition metal of zero oxidation degree that is gold, palladium, platinum, nickel, cobalt, copper, silver, rhodium, ruthenium, iron, iridium, or a mixture or alloy thereof.

8. The material according to claim 1, wherein said transition metal oxide and/or rare earth metal oxide is at least one polymetal oxide with crystallographic structure a spinel $AB_2O_4$, perovskite $ABO_3$ or ilmenite $ABO_3$, whereby A and/or B is at least one transition metal and/or rare earth metal.

9. The material according to claim 8, wherein the metal nanoparticles consist of a spinel $AB_2O_4$, perovskite $ABO_3$ or ilmenite $ABO_3$, whereby A and/or B is at least one transition metal and/or rare earth metal.

10. The material according to claim 1, wherein said metal nanoparticles comprise at least one chalcongenide that is formed by a transition metal M and a chalcogen element C that is sulfur, selenium or tellurium.

11. The material according to claim 1, wherein said metal nanoparticles have 0.1 to 30% by weight of said material.

12. The material according to claim 1, wherein each of said spherical particles comprises zeolitic nanocrystals.

13. The material according to claim 12, wherein said zeolitic nanocrystals have a pore size of between 0.2 and 2 nm.

14. The material according to claim 12, wherein said zeolitic nanocrystals comprise at least one zeolite that is a zeolite of MFI, BEA, FAU or LTA structure.

15. The material according to claim 12, wherein said zeolitic nanocrystals comprise at least one completely silicic zeolite.

16. The material according to claim 12, wherein said zeolitic nanocrystals comprise at least one zeolite that contains silicon and aluminum.

17. The material according to claim 1, having a specific surface area of between 100 and 1100 $m^2/g$.

18. A process for the preparation of a material according to claim 1, comprising a) synthesizing metal particles of a maximum nanometric size that is equal to 300 nm so as to obtain a stable colloidal solution in which said nanoparticles are dispersed; b) mixing in solution of at least one surfactant, at least one precursor of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, of at least one colloidal solution of metal nanoparticles obtained according to a), optionally at least one precursor of at least one element X' that is silicon, aluminum, titanium, tungsten, zirconium, gallium, germanium, tin, antimony, lead, vanadium, iron, manganese, hafnium, niobium, tantalum, yttrium, cerium, gadolinium, europium or neodymium, (whereby X and X' are different), and optionally at least one stable colloidal solution in which crystals of zeolites of a maximum nanometric size that is equal to 300 nm are dispersed; c) aerosol spraying of said solution that is obtained in stage b) to lead to the formation of spherical droplets with a diameter of less than 200 µm; d) drying of said droplets, and e) elimination of at least said surfactant for obtaining a mesostructured material in which metal nanoparticles are trapped.

19. The process according to claim 18, wherein the element X is aluminum, titanium, zirconium, gallium, germanium or cerium.

20. The process according to claim 18, wherein the element X' is silicon.

21. The process according to claim 18, wherein said surfactant is a three-block copolymer, whereby each block consists of a poly(alkylene oxide) chain.

22. The process according to claim 21, wherein said three-block copolymer consists of two poly(ethylene oxide) chains and one poly(propylene oxide) chain.

23. The process according to claim 18, wherein said surfactant is cetyltrimethyl ammonium bromide.

24. An inorganic material consisting of at least two elementary spherical particles, each of said spherical particles consisting of metal nanoparticles that are between 1 and 300 nm in size, said metal nanoparticles comprising at least one transition metal oxide and/or at least one rare earth metal oxide in which said metal is Ti, Zr, Nb, Ta, Mo, W, Fe, Co, Cu, Y, La, Ni, Cr, Pd, Pt, Ce, Eu, Nd, Gd or mixtures thereof, said metal nanoparticles being trapped within a mesostructured matrix with an oxide base of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, whereby said mesostructured matrix has a pore size of between 1.5 and 30 nm and has amorphous walls with a thickness of between 1 and 30 nm, said elementary spherical particles having a maximum diameter of 10 µm, said inorganic material being prepared by a process comprising a) synthesizing metal particles of a maximum nanometric size that is equal to 300 nm so as to obtain a stable colloidal solution in which said nanoparticles are dispersed; b) mixing in solution of at least one surfactant, at least one precursor of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, of at least one colloidal solution of metal nanoparticles obtained according to a), optionally at least one precursor of at least one element X' that is silicon, aluminum, titanium, tungsten, zirconium, gallium, germanium, tin, antimony, lead, vanadium, iron, manganese, hafnium, niobium, tantalum, yttrium, cerium, gadolinium, europium or neodymium, (whereby X and X' are different), and optionally at least one stable colloidal solution in which crystals of zeolites of a maximum nanometric size that is equal to 300 nm are dispersed; c) aerosol spraying of said solution that is obtained in stage b) to lead to the formation of spherical droplets with a diameter of less than 200 µm; d) drying of said droplets, and e) elimination of at least said surfactant for obtaining a mesostructured material in which metal nanoparticles are trapped.

25. An inorganic material consisting of at least two elementary spherical particles, each of said spherical particles comprising metal nanoparticles that are between 1 and 300 nm in size, said metal nanoparticles comprising at least one polymetal oxide with crystallographic structure a spinel $AB_2O_4$, perovskite $ABO_3$ or ilmenite $ABO_3$, whereby A and/or B is at least one transition metal and/or rare earth metal, said metal nanoparticles being trapped within a mesostructured matrix with an oxide base of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, whereby said mesostructured matrix has a pore size of between 1.5 and 30 nm and has amorphous walls with a thickness of between 1 and 30 nm, said elementary spherical particles having a maximum diameter of 10 μm.

26. The material according to claim 25, wherein the metal nanoparticles consist of a spinel $AB_2O_4$, perovskite $ABO_3$ or ilmenite $ABO_3$, whereby A and/or B is at least one transition metal and/or rare earth metal.

27. The material according to claim 25, wherein each of said spherical particles comprises zeolitic nanocrystals.

28. The material according to claim 27, wherein said zeolitic nanocrystals have a pore size of between 0.2 and 2 nm.

29. The material according to claim 27, wherein said zeolitic nanocrystals comprise at least one zeolite that is a zeolite of MFI, BEA, FAU or LTA structure.

30. The material according to claim 27, wherein said zeolitic nanocrystals comprise at least one completely silicic zeolite.

31. The material according to claim 27, wherein said zeolitic nanocrystals comprise at least one zeolite that contains silicon and aluminum.

32. The material according to claim 25, wherein element X is aluminum, titanium, zirconium, gallium, germanium or cerium.

33. The material according to claim 25, wherein said mesostructured matrix comprises at least one element X' that is silicon, aluminum, titanium, tungsten, zirconium, gallium, germanium, tin, antimony, lead, vanadium, iron, manganese, hafnium, niobium, tantalum, yttrium, cerium, gadolinium, europium or neodymium, whereby the elements X and X' are different.

34. The material according to claim 33, wherein said element X is aluminum and said element X' is silicon.

35. The material according to claim 25, wherein said metal nanoparticles comprise at least one transition metal of zero oxidation degree that is gold, palladium, platinum, nickel, cobalt, copper, silver, rhodium, ruthenium, iron, iridium, or a mixture or alloy thereof.

36. The material according to claim 25, wherein said metal nanoparticles have 0.1 to 30% by weight of said material.

37. The material according to claim 25, having a specific surface area of between 100 and 1100 $m^2/g$.

38. An inorganic material consisting of at least two elementary spherical particles, each of said spherical particles comprising metal nanoparticles that are between 1 and 300 nm in size, at least one chalcongenide that is formed by a transition metal M and a chalcogen element C that is sulfur, selenium or tellurium said metal nanoparticles being trapped within a mesostructured matrix with an oxide base of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, whereby said mesostructured matrix has a pore size of between 1.5 and 30 nm and has amorphous walls with a thickness of between 1 and 30 nm, said elementary spherical particles having a maximum diameter of 10 μm.

39. The material according to claim 28, wherein each of said spherical particles comprises zeolitic nanocrystals.

40. The material according to claim 39, wherein said zeolitic nanocrystals have a pore size of between 0.2 and 2 nm.

41. The material according to claim 39, wherein said zeolitic nanocrystals comprise at least one zeolite that is a zeolite of MFI, BEA, FAU or LTA structure.

42. The material according to claim 39, wherein said zeolitic nanocrystals comprise at least one completely silicic zeolite.

43. The material according to claim 39, wherein said zeolitic nanocrystals comprise at least one zeolite that contains silicon and aluminum.

44. The material according to claim 38, wherein element X is aluminum, titanium, zirconium, gallium, germanium or cerium.

45. The material according to claim 38, wherein said mesostructured matrix comprises at least one element X' that is silicon, aluminum, titanium, tungsten, zirconium, gallium, germanium, tin, antimony, lead, vanadium, iron, manganese, hafnium, niobium, tantalum, yttrium, cerium, gadolinium, europium or neodymium, whereby the elements X and X' are different.

46. The material according to claim 45, wherein said element X is aluminum and said element X' is silicon.

47. The material according to claim 38, wherein said metal nanoparticles comprise at least one transition metal of zero oxidation degree that is gold, palladium, platinum, nickel, cobalt, copper, silver, rhodium, ruthenium, iron, iridium, or a mixture or alloy thereof.

48. The material according to claim 38, wherein said metal nanoparticles have 0.1 to 30% by weight of said material.

49. The material according to claim 38, having a specific surface area of between 100 and 1100 $m^2/g$.

50. An inorganic material consisting of at least two elementary spherical particles, each of said spherical particles comprising metal nanoparticles that are between 1 and 300 nm in size, trapped within a mesostructured matrix with an oxide base of at least one element X that is aluminum, titanium, tungsten, zirconium, gallium, germanium, tin, antimony, lead, vanadium, iron, manganese, hafnium, niobium, tantalum, yttrium, cerium, gadolinium, europium or neodymium, whereby said mesostructured matrix has a pore size of between 1.5 and 30 nm and has amorphous walls with a thickness of between 1 and 30 nm, said elementary spherical particles having a maximum diameter of 10 μm and wherein each of the spherical particles comprise zeolitic nanocrystals.

* * * * *